March 7, 1961     D. G. KOLARIK     2,973,598
RECIPROCATING DISPLAY DEVICES
Filed Feb. 1, 1960
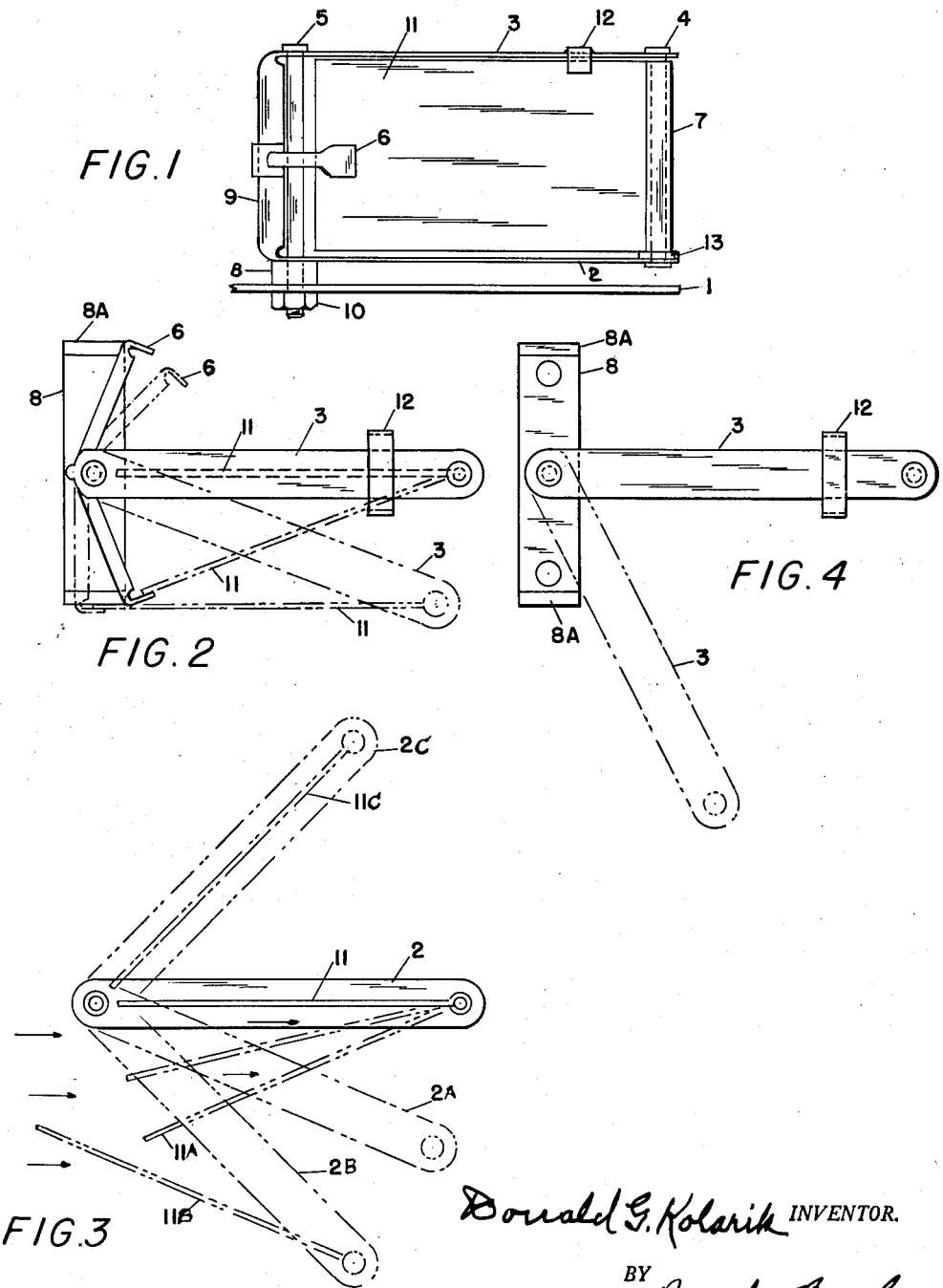

United States Patent Office 2,973,598
Patented Mar. 7, 1961

2,973,598
RECIPROCATING DISPLAY DEVICES
Donald G. Kolarik, 1718 N. 10th St., Clinton, Iowa
Filed Feb. 1, 1960, Ser. No. 5,911
3 Claims. (Cl. 40—37)

My invention relates to reciprocating display devices driven by the wind or by air currents produced by the moving automobile or fans.

The objects of my invention are to provide a vertical plate carrying a flag, a picture, an advertisement, or other desired matter to be displayed, pivotally mounted upon an automobile hood or other suitable support where it is exposed to the action of wind or other currents of air in such a way as to cause a movable plate embodied therein to swing laterally from side to side upon a pivot at the rear of a rectangular frame.

The front end of the frame is pivotally mounted upon a suitable supporting post in vertical position whereby the currents of air striking either side of the plate will cause the frame to swing from side to side upon its front pivot whereby reversing the angle of the longitudinal axis of the plate from side to side with great swiftness, likely to attract and hold the interest of persons who may be in sight thereof.

To provide a decorative or advertising device of especial attractiveness which can be readily attached to automobiles or mounted in store windows and will be operable by currents of air from wind, the motion of an automobile, or by a fan.

I accomplish these objects by the means shown in the accompanying drawings, in which—

Figure 1 is a side elevation of my appliance in place upon the hood of an automobile or other suitable support;

Figure 2 is a top or plan view of my appliance showing the frame in adjusted position, and in broken lines showing a lateral position of the frame when swung to one side of its normal position;

Figure 3 is a top view of the swinging plate and the lower bar of the frame with alternate positions of the plate and lower bar of the frame in dotted lines;

Figure 4 is a top view of the frame showing an alternative form of stop for the swinging plate.

Similar numerals refer to similar parts throughout the several views.

My appliance consists of a rectangular frame with an upper bar 3 and a lower bar 2 united at their front end by a brace bar 9. The rear ends of the bars 2 and 3 are rigidly united to a pivot post or bar 4 and with their front ends pivotally mounted upon a post or bar 5. The lower end of the post 5 is threaded and extends through and is secured by a nut 10 to the hood of an automobile or other suitable base.

Rotatably mounted upon the pivot bar 4 is a sleeve 7. This sleeve is formed integral with a rectangular plate 11 which extends forwardly nearly to the post 5. The frame may swing upon the post 5 from side to side within limits provided by stops 8A formed at the outer end of a transverse bar 8.

The bar 8 is secured in position between the lower bar 2 of the frame and the base 1 and its outer ends are turned upwardly at 8A as shown in Figure 4, to act as stops to limit the lateral swing of the frame.

An additional transverse bar 12 may be mounted upon the upper bar 3 of the frame with its ends turned downwardly to afford stops to limit the lateral swing of the plate 11.

A transverse bar 6 is rigidly united to the brace bar 9 and its ends are turned rearwardly to form stops for the front end of the plate 11 on both sides of the longitudinal axis of the automobile or base.

The plate 11 may have painted or imprinted on one or both sides thereof, a flag, a comical picture, an advertisement, or any other matter designed to attract the attention of observers to the rapid movement thereof from side to side.

When mounted upon an automobile, the vertical post or bar 5 and the attached end of the rectangular frame pivoted thereon will lead forwardly, and the rectangular frame will be free to swing from side to side upon the post 5 as a pivot. The plate 11 will normally be placed in line with the longitudinal axis of an automobile as in Figure 2, but will be free to swing laterally upon the pivot 4 as shown in dotted lines in Figure 3.

The lateral swing of the rectangular frame will be limited by the detents 8A at the ends of the transverse bar 8.

In the oridinary course of usage, the plate 11 is likely to be joggled or moved a short distance laterally as shown in broken lines 11A in Figure 3. The current of air striking it then as shown by the arrow, will exert a force upon the longitudinal frame tending to swing the frame to such a position as 2A or 2B. When in position 2B, the plate will have been inclined in the opposite direction by one of the detents at the end of the bar 6 into the position 11B of Figure 3, and the air currents as shown by the adjacent arrow will strike the opposite side of the plate 11 and will immediately cause the rectangular frame to swing to the opposite side of the post 5 where the same operation will take place but in the opposite direction. Thus there will be a continuous reciprocating motion as long as the air currents continue and this will be true whether the device is at the front of an automobile or placed where a current of air from an electric fan or other air force, will strike it.

The various parts of this device may be made of aluminum, iron, tin, plastic, or of any other suitable material and the size, shape, and proportions of the various parts may be varied to meet the desires of the users for various forms of decorating, advertisements, etc., without departing from the spirit of my invention as expressed in the claims, and I do not limit my claims to the precise forms shown in the drawings.

I claim:

1. In a reciprocating display device, the combination with a vertical support bar rigidly mounted upon a horizontal base, of a rectangular frame parallel to the longitudinal axis of the base comprising upper and lower bars united at the front by a vetrical brace bar and at the rear by a pivot bar and pivotally hinged to the vertical support, and a rectangular plate a little smaller than the frame hinged upon the pivot bar and freely swingable thereon laterally through and to either side of the frame.

2. A reciprocating display device as described in claim 1, and means whereby the lateral swing of both the frame and the plate will cause a head wind to alternately strike opposite sides of the plate and swing them alternately in opposite directions laterally.

3. In a reciprocating display device, the combination with a vertical support bar rigidly mounted upon a horizontal base, of a rectangular frame parallel to the longitudinal axis of the base comprising upper and lower bars united at the front by a vertical brace bar and at the rear by a pivot bar and pivotally hinged to the vertical support, a rectangular plate a little smaller than the frame hinged upon the pivot bar and freely swingable thereon laterally through and to either side of the frame, and a transverse bar united to the brace bar having its ends turned rearwardly at an angle and of sufficient length to contact and stop the front edge of the plate when swung a predetermined distance laterally to either side by the swinging of the frame whereby contact of a headon wind or air current with the outer side of the plate will reverse the movement of the plate and frame.

References Cited in the file of this patent

UNITED STATES PATENTS

| | | |
|---|---|---|
| 1,396,640 | King | Nov. 8, 1921 |
| 1,851,608 | Vitali | Mar. 29, 1932 |
| 1,953,756 | Hennessey et al. | Apr. 3, 1934 |
| 2,175,077 | Craig | Oct. 3, 1939 |
| 2,667,002 | Clore | Jan. 26, 1954 |